United States Patent [19]
Onaka et al.

[11] Patent Number: 5,292,187
[45] Date of Patent: Mar. 8, 1994

[54] SLIP CONTROL SYSTEM FOR AN AUTOMOTIVE VEHICLE

[75] Inventors: Toru Onaka; Toshiaki Tsuyama, both of Hiroshima, Japan

[73] Assignee: Mazda Motor Corporation, Hiroshima, Japan

[21] Appl. No.: 991,326

[22] Filed: Dec. 16, 1992

[30]  Foreign Application Priority Data

Dec. 16, 1991 [JP]  Japan .................. 3-352747

[51] Int. Cl.[5] ................................. B60T 8/32
[52] U.S. Cl. ................. 303/103; 188/181 A; 303/100; 303/106; 303/109
[58] Field of Search ............ 303/109, 108, 102, 103, 303/110, 100, 107, 106, 105, 104, 97, 99; 364/426.02, 426.03, 426.01; 188/181 A, 181 R

[56]    References Cited
   U.S. PATENT DOCUMENTS 5,190,361  3/1993  Onaka et al. ............... 303/109 X

FOREIGN PATENT DOCUMENTS

57-130754  1/1982  Japan .
61-24220   6/1986  Japan .

Primary Examiner—Douglas C. Butler
Attorney, Agent, or Firm—Fish & Richardson

[57]  ABSTRACT

A slip control system is so adapted as to start the control of the braking force from a state in which the braking force is reduced when a magnitude of deceleration of the wheel becomes equal to or larger than a predetermined value or when a slip value of the wheel becomes a value in the direction in which the wheel is likely to be locked and as to start the control of the braking force from a state in which the braking force is sustained when the deviation obtained by subtracting the wheel speed from the vehicle speed becomes equal to or larger than a predetermined value. This arrangement satisfies requirements for both preventing the wheel from being locked and shortening the braking distance.

20 Claims, 7 Drawing Sheets

SLIP CONTROL SYSTEM FOR AN AUTOMOTIVE VEHICLE

BACKGROUND OF THE INVENTION

1. Field of the Invention

The present invention relates to a slip control system for an automotive vehicle.

2. Description of the Related Art

Recently, an increasing number of automotive vehicles are loaded with a slip control system, as usually called "ABS system", which is arranged to prevent the wheels from being locked at the moment of braking (for example, Japanese Utility Model Laid-open Publication No. 57-130,754).

In order to implement the control of the ABS system, i.e. to control the braking force, there may be at least two modes for controlling the braking force, a first mode being so adapted as to control the activity to reduce the braking force, and a second mode being so adapted as to control the activity to elevate the braking force. In addition, a mode may added as a third mode which is so adapted as to control the activity to sustain the braking force.

It is noted herein that whether the wheel is locked can usually be determined on the basis of a slip value determined from an assumed vehicle speed to be given theoretically and an actual wheel speed. Hence, the determination if the control of the braking force should be started can be implemented by determining if the slip value exceeds a predetermined threshold value.

Further, it can be noted that the magnitude of deceleration indicates a behavior of the wheels with considerable accuracy and that the magnitude of deceleration can be determined with ease and with accuracy by differentiating the wheel speeds detected by wheel speed sensors. Hence, if the ABS control should be started can be determined by determining if the magnitude of deceleration of the wheel exceeds a predetermined threshold value. Japanese Patent Laid-open Publication (kokai) No. 61-24,220 discloses an example that takes advantage of the magnitude of deceleration of the wheel for the ABS control. This publication proposes that if the control of the activity to reduce the braking force has been finished is decided by determining if the magnitude of deceleration of the wheel exceeds the predetermined threshold value.

On the other hand, strong demands in the ABS control have recently been made to shorten a distance required upon braking the wheels, i.e. a braking distance. In order to shorten the braking distance, it is disadvantageous to cause the braking force to be reduced to an unnecessary extent by the ABS control. Hence, it is considered to start the ABS control from the state in which the braking force is sustained.

It can be noted, however, that, if the ABS control would be always started from the state in which the braking force is sustained, the wheels are caused to be locked more or less when the wheels are brought into a state in which they are very likely to be locked, for example, at the time of rapid braking.

SUMMARY OF THE INVENTION

The object of the present invention is to provide a slip control system for an automotive vehicle so adapted as to satisfy the requirements for shortening the braking distance as well as for preventing the wheels from being locked.

In order to achieve the aforesaid object, the present invention provides a slip control system for an automotive vehicle capable of controlling braking force so as not to cause the wheel to be locked at the time of braking at least by controlling the activity to sustain the braking force, elevate the braking force, or reduce the braking force, comprising:

a first start means for starting the control of the braking force from a state in which the braking force is reduced, when a slip value indicative of a magnitude of deceleration of the wheel or the tendency of locking the wheel against a road surface exceeds a predetermined threshold value; and a second start means for starting the control of the braking force from a state in which the braking force is sustained, when a deviation obtained by subtracting a wheel speed from a vehicle speed reaches a predetermined value or larger.

As the deviation between the vehicle speed and the wheel speed, there may be employed the sum of the deviations in a predetermined period of time. In this case, it may be decided to determine if the control of the braking force by the second start means should be started whenever the sum is renewed within the predetermined period of time, that is, the sum is compared with the predetermined value. Further, the sum obtained for the first time after the elapse of the predetermined period of time may be compared with the predetermined value.

When the slip value of the wheel or the degree of deceleration of the wheel exceeds the predetermined threshold value, it can be judged that the wheel is brought into a state in which the wheel is very likely to be locked rapidly, for example, by depressing the braking pedal strongly and rapidly. Hence, in this case, the control of the braking force is allowed to be started by the first start means from the state in which the braking force is reduced, so that the wheels are prevented from being locked rapidly.

Further, when the deviation obtained by subtracting the wheel speed from the vehicle speed reaches the predetermined value or larger, it may be decided that the braking pedal is being depressed slowly in particular on a road surface having a high road surface friction coefficient $\mu$. Hence, in this case, the braking force is controlled by the second start means from the state in which the braking force is sustained; hence, this arrangement is preferred for causing no braking force to be reduced to an unnecessary level and for shortening the braking distance.

As described hereinabove, the slip control system of the present invention is so adapted as to satisfy the requirements at a high dimension by optimizing the state of controlling the braking force at the time of starting the control of the braking force, the requirements for preventing the wheels from being locked and for shortening the braking distance.

Other objects, features and advantages of the present invention will become apparent during the description of the preferred embodiments, which follows, with reference to the accompanying drawings.

DESCRIPTION OF THE PREFERRED EMBODIMENTS

Figure 1:
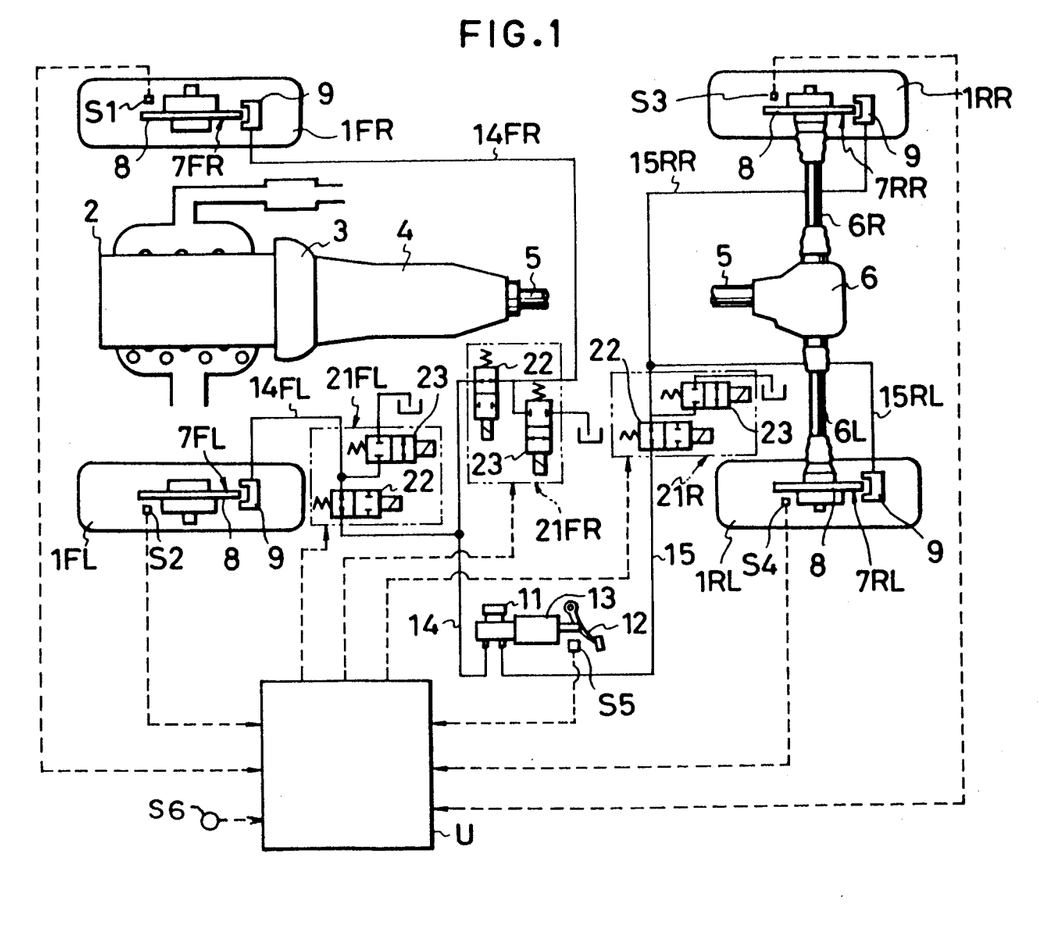
FIG. 1 is a system representation showing an outline of the slip control system according to an embodiment of the present invention.

FIG. 1

As shown in FIG. 1, reference numeral 1FR stands for a right-hand front wheel, reference numeral 1FL for a left-hand front wheel, reference numeral 1RR for a right-hand rear wheel and reference numeral 1RL for a left-hand rear wheel. The output torque of an internal combustion engine 1 is transmitted through a clutch 3, a transmission 4, a propeller shaft 5 and a differential 6 to a right-hand driving shaft 6R and a left-hand driving shaft 6L, through which the output torque is transmitted to the right-hand rear wheel 1RR and the left-hand rear wheel 1RL, respectively.

Mounted to the wheels 1FR, 1FL, 1RR and 1RL are braking units 7FR, 7FL, 7RR and 7RL, respectively, each of which has a disc 8 arranged so as to be rotatable integrally with the respective wheel and a caliper 9 with a wheel cylinder built therein.

Reference numeral 11 denotes a master cylinder as means for generating braking oil pressure, and a force obtained by depressing a braking pedal 12 is entered into the master cylinder 11 through a servomechanism 13. The master cylinder 11 is of a tandem type having two outlets, and a braking pipe 14 extending from one of the outlets branches into two branch pipe sections at its intermediate position. The right-hand branch pipe section 14FR is connected to the wheel cylinder of the brake unit 7FR for the right-hand front wheel, while the left-hand branch pipe section 14FL is connected to the wheel cylinder of the brake unit 7FL for the left-hand front wheel. Further, a braking pipe 15 extending from the other outlet of the master cylinder 11 branches into two branch pipe sections at its intermediate position, and the right-hand branch pipe section 15RR is connected to the wheel cylinder of the brake unit 7RR for the right-hand rear wheel while the left-hand branch pipe section 15RL is connected to the wheel cylinder of the brake unit 7RL for the left-hand rear wheel.

A right-hand oil pressure adjusting mechanism 21FR is connected to the right-hand branch pipe section 14FR for the right-hand front wheel and a left-hand oil pressure adjusting mechanism 21FL is connected to the left-hand branch pipe section 14FL for the left-hand front wheel. On the other hand, a common oil pressure adjusting mechanism 21R is connected to the common pipe 15 for the right-hand and left-hand rear wheels. Each of the oil pressure adjusting mechanisms 21FR, 21FL and 21R has a first opening-closing valve 22 and a second opening-closing valve 23, each of the first and second opening-closing valves 22 and 23 being of an electromagnetic type. The first opening-closing valve 22 opens or closes the right-hand pipe section 14FR, the left-hand pipe section 14FL or the common pipe 15, while the second opening-closing valve 23 opens or closes a passage communicating each of the pipes with a reserve tank. This arrangement can shift the braking oil pressure to be supplied to the brake units 7FR, 7FL, 7RR and 7RL so as to be increased, decreased or retained, when the wheels are braked by the braking oil pressure generated in the master cylinder 21. In other words, the braking oil pressure is decreased by closing the first opening-closing valve 22 and opening the second opening-closing valve 23, the braking oil pressure is increased by opening the first opening-closing valve 22 and closing the second opening-closing valve 23, and the oil pressure is retained by closing both of the first and second opening-closing valves 22 and 23. It is further to be noted in this embodiment that the braking oil pressure is rapidly increased in the initial stage of an increase in the braking oil pressure and the rate of the increase is thereafter slowed down to such an extent as increasing gradually. This control is implemented, for example, by subjecting a speed (an angle) of opening the first opening-closing valve 22 to duty control.

In FIG. 1, reference symbol U denotes a control unit composed of a microcomputer with CPU, ROM, RAM, CLOCK, I/O interface, etc. built therein. Entered into the control unit U are signals from switches S1, S2, S3 and S4, which are to sense speeds of rotation of the right-hand and left-hand front wheels 1FR and 1FL as well as the right-hand and left-hand rear wheels 1RR and 1RL, respectively. Further, a signal from a switch S5 is entered, which is a brake switch that is turned on when the braking pedal 12 is depressed. The control unit U controls the oil pressure adjusting mechanisms 21FR, 21FL and 21R, while the control unit U performs the ABS control for the right-hand and left-hand front wheels 1FR and 1FL in an independent and separate manner as well as for the right-hand and left-hand rear wheels 1RR and 1RL in an integrated manner. It is to be noted that, as the condition for the start of the ABS control, the brake switch S5 may be turned on, although the condition that the brake switch S5 is turned on can be excluded from the conditions for the start of the ABS control.

Figure 2:
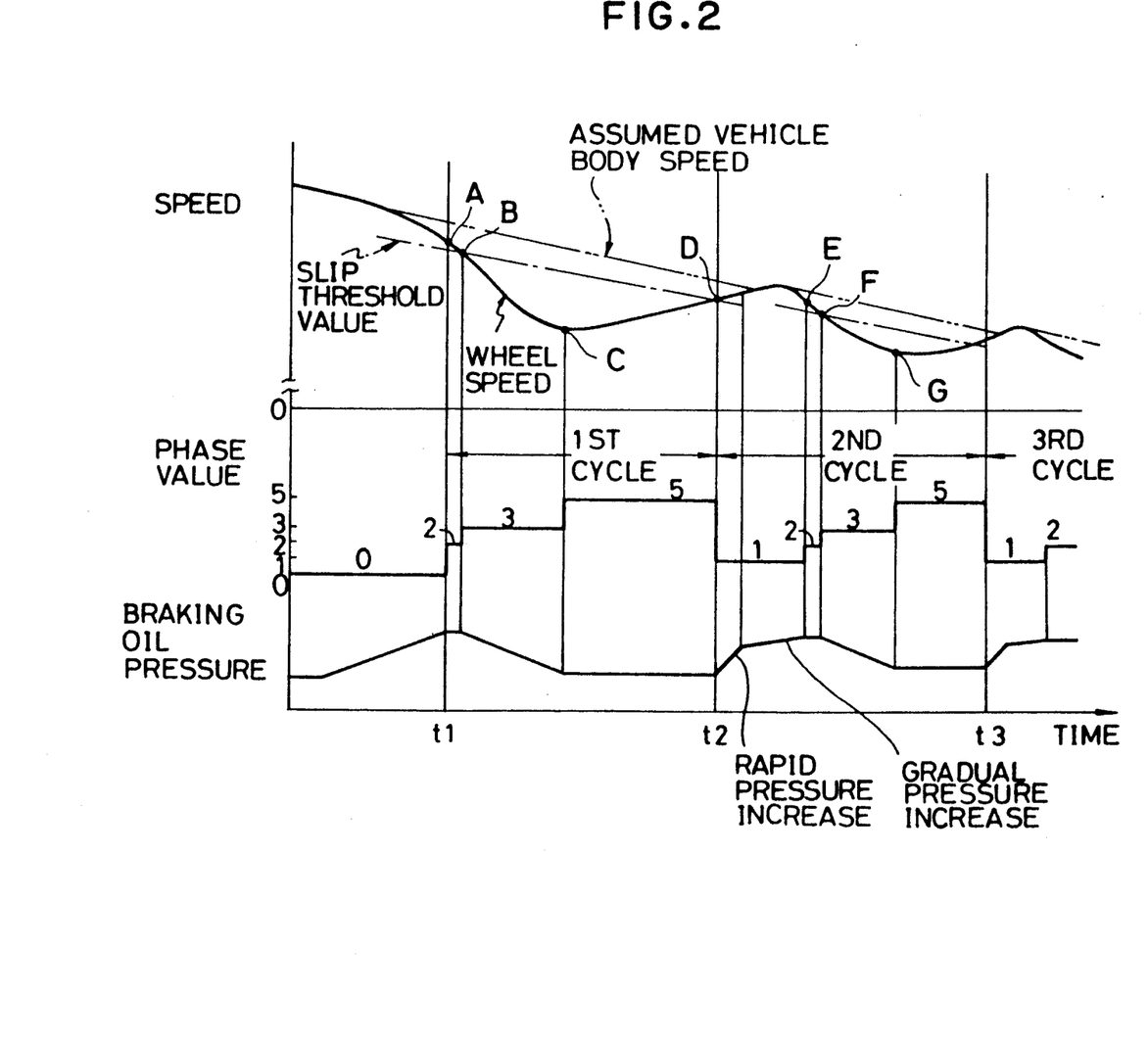
FIG. 2 is a time chart showing control of the slip control system according to the present invention.

FIG. 2

The contents of the ABS control by the control unit U will be described with reference to FIG. 2. In performing the ABS control, phases 0, 1, 2, 3 and 5 are employed, which have the following meanings:

Phase 0: non-ABS control

Phase 1: increasing pressure (elevating the braking force)

Phase 2: retaining pressure (sustaining the braking force) after non-ABS control or after increasing pressure Phase 3: decreasing pressure (reducing braking force)

Phase 5: retaining pressure after control for decreasing pressure

The slip value indicating the tendency of locking the wheel is determined by the following formula:

$$\text{Slip value} = (\text{wheel speed}/\text{assumed vehicle body speed}) \times 100\%$$

In this embodiment, the smaller the slip value, the greater or the stronger the tendency of locking the wheels.

Given the foregoing, no ABS control is carried out up to the time t1 (phase 0) and the wheel speed is slowed down gradually to a level lower than the assumed vehicle body speed as the braking oil pressure is elevated. By slowing the wheel speed down, the magnitude of deceleration of the wheel speed is increased and reaches a predetermined value at the time t1, i.e. the moment A, which satisfies the condition under which to start the ABS control, i.e. control by the slip control system.

As the ABS control starts at the moment A, the braking oil pressure is first retained. The wheel speed is slowed down, however, while the braking oil pressure is retained. As the slip value is decreased and reaches a predetermined threshold value at the moment B (phase 2), then the oil pressure starts reducing and the extent to which the wheel speed is slowed down becomes so slow that the magnitude of deceleration reaches approximately zero at the moment C (phase 3).

At the moment C when the magnitude of deceleration has reached approximately zero, the braking oil pressure is retained as it is, thereby increasing the wheel speed gradually and returning the slip value to the predetermined threshold value at the moment D (phase 5). From the moment D, the braking oil pressure is increased in such a manner that it is increased in the initial stage to such an extent as the rate of increasing the pressure is rapid and thereafter to a slower extent. It is noted that phase 1 continues from the moment D to the moment E (phase 1).

By increasing the braking oil pressure at the moment D, the deceleration of the wheel speed is increased again and reaches the predetermined value satisfying the condition for the start of the ABS control at the moment E. Then, the braking oil pressure is retained from the moment E up to the moment F at which the slip value is lowered to a predetermined threshold value (phase 2), followed by reducing the braking oil pressure up to the moment G (phase 3) corresponding to the moment C. After the moment G, the braking oil pressure is retained (phase 5).

The arrangement as described hereinabove is an outline of the ABS control, i.e. the control by the slip control system. One control cycle continues from the moment D at which phase 5 ends, i.e. from the moment when the braking oil pressure has been decreased and starts increasing, to the end of the next phase 5. In other words, one control cycle comprises phases 1, 2, 3 and 5. It is to be noted herein that only the very first control cycle comprises phases 2, 3 and 5 because the ABS control starts from the phase 2.

The threshold value at which the phase is changed varies with a friction coefficient $\mu$ on a road surface, i.e. a road surface friction coefficient $\mu$. An example of setting the threshold values in accordance with the road surface friction coefficient $\mu$ is shown as follows:

TABLE

| ROAD SURFACE FRICTION COEFFICIENT $\mu$ | PHASES | | |
|---|---|---|---|
| | $1 \to 2$ | $2 \to 3$ $5 \to 1$ | $3 \to 5$ |
| 1 (LOW) | $-0.5$ G | 95% | 0 G |
| 2 (MEDIUM) | $-1.0$ G | 90% | $-0.2$ G |
| 3 (HIGH) | $-1.5$ G | 85% | $-0.5$ G |

In the above table, the symbol "G" denotes the gravity acceleration.

Although not shown in the table as described hereinabove, it is preferred that the threshold value as the condition for starting the ABS control be varied with the road surface friction coefficient $\mu$. In this case, the smaller the road surface friction coefficient $\mu$, the smaller the threshold value for the magnitude of the deceleration of the wheel speed as the condition for the start of the ABS control by the first start means. On the other hand, the smaller the road surface friction coefficient $\mu$, the larger the threshold value for the slip value. Likewise, the smaller the road surface friction coefficient $\mu$, the smaller the predetermined value to be compared with the deviation obtained by subtracting the wheel speed from the vehicle speed, as the second start means. Further, the threshold value and the predetermined value can be altered in accordance with the road surface friction coefficient $\mu$ in the direction in which the control of the braking force is more likely to be started, as the road surface friction coefficient $\mu$ becomes smaller.

Figure 3:
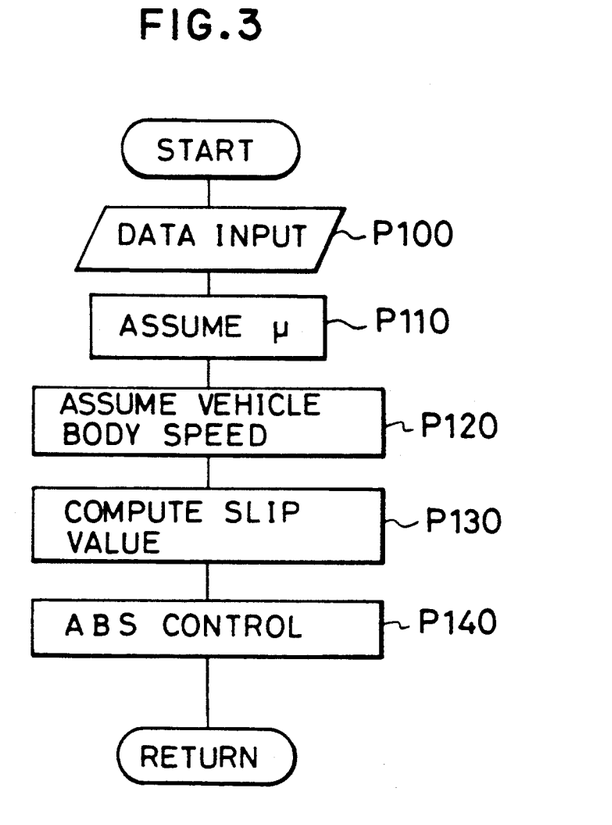
FIGS. 3, 4 and 5 are flow charts showing an example of the control by the slip control system according to the present invention.

FIG. 3

FIG. 3 shows the flow chart showing an example of the control relating to the present invention.

First, at step P100, signals are entered into the control unit U from the switches S1 to S5, followed by proceeding to step P110 at which the road surface friction coefficient $\mu$ is assumed. Then, at step P120, the vehicle body speed is assumed to determine the assumed vehicle body speed and, at step P130, the slip value for the ABS control is computed, followed by proceeding to step P140 at which the ABS control is implemented.

Figure 4:
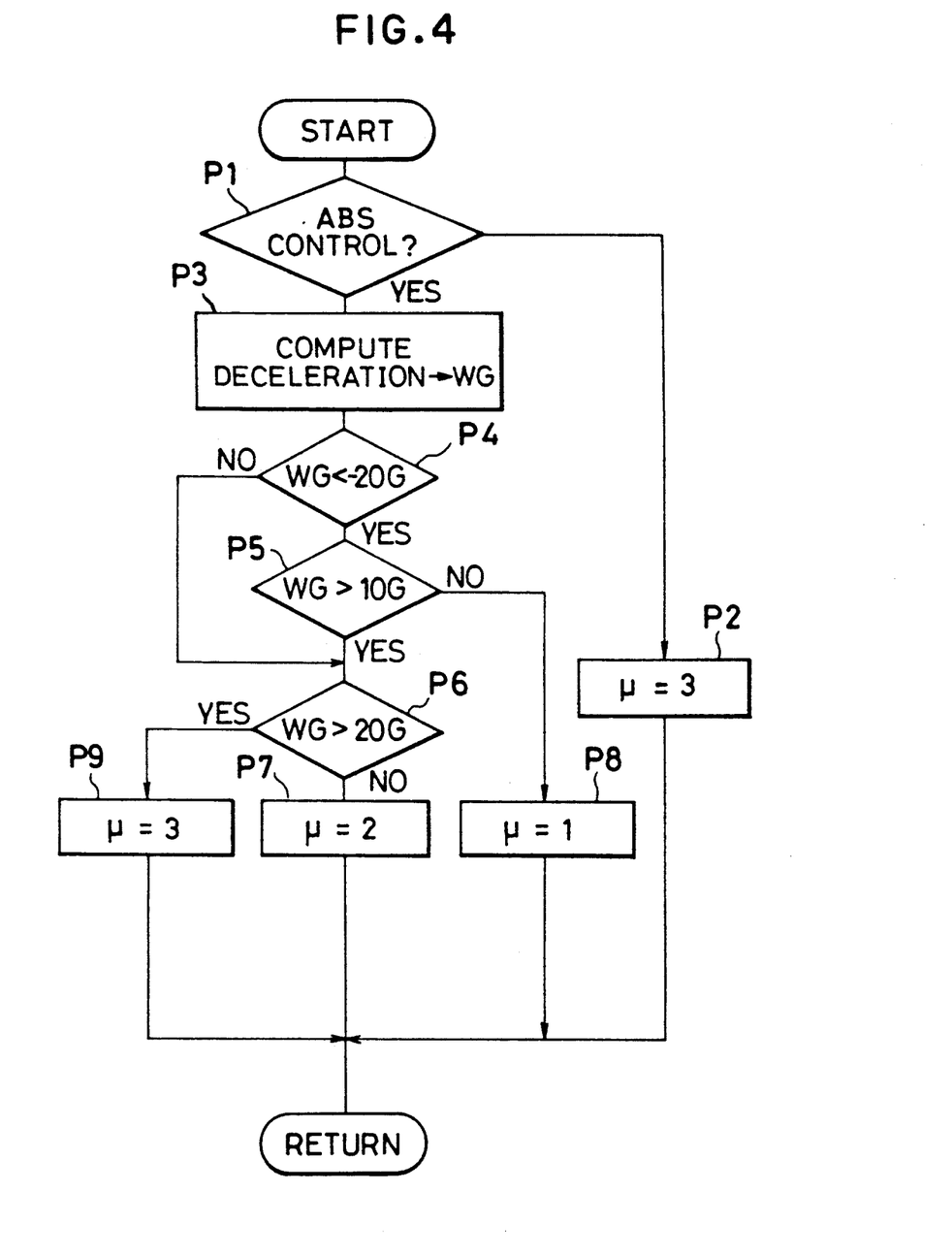

FIG. 4

FIG. 4 shows the practices for assuming the road surface friction coefficient $\mu$ according to the contents at step P110 of FIG. 3.

First, at step P1, a decision is made to determine if the ABS control is currently in progress and the road surface friction coefficient $\mu$ is set at step P2 to 3 ($\mu=3$), i.e. a high road surface friction coefficient $\mu$, when it is decided at step P1 that no ABS control is currently in progress. In other words, when no control by the slip control system is currently carried out, the road surface friction coefficient $\mu$ is forcibly set to a high value, thereby suppressing the braking oil pressure from being reduced at the initial time when the ABS control starts and reducing the braking distance.

On the other hand, when the result of decision at step P1 indicates that the ABS control is currently being performed, then the program flow goes to step P3 at which the speed of accelerating or decelerating the wheels, WG, is computed (renewed) by differentiating the wheel speeds. In computing the speed of accelerating or decelerating the wheels, WG, the maximum value for a predetermined period of time is stored in the RAM of the control unit U as acceleration, while the minimum value therefor is stored as deceleration. Then, at step P4, it is decided to determine if the deceleration (WG) is smaller than $-20$ G as a predetermined threshold value. It is to be noted herein that the threshold value of $-20$ G means a value corresponding to $-20$ G in a predetermined sampling cycle of the wheel speed and this meaning is applicable likewise to the following description.

When the result of decision at step P4 indicates that the magnitude of deceleration is smaller than $-20$ G, there is the possibility that the road surface friction coefficient $\mu$ is so low that, at step P5, a decision is made to determine if the magnitude of acceleration (WG) is larger than 10G. When it is decided at step P5 that the magnitude of acceleration is not larger than 10G, then the road surface friction coefficient $\mu$ is set at step P8 to 1 ($\mu=1$), i.e. a low road surface friction coefficient $\mu$.

On the other hand, when the result of decision at step P4 indicates that the magnitude of deceleration is not smaller than $-20$ G and the result of decision at step P5 indicates that the magnitude of acceleration is larger than 10G, then the program flow goes to step P6 at which a decision is made to determine if the magnitude of acceleration (WG) is larger than 20G. As a result of decision at step P6 indicates that the magnitude of acceleration (WG) is not larger than 20G, then the road surface friction coefficient $\mu$ is set at step P7 to 2 ($\mu=2$), i.e. a medium road surface friction coefficient $\mu$. On the other hand, when it is decided at step P6 that the magnitude of acceleration is larger than 20G, then the program flow is returned to step P9 at which the road surface friction coefficient $\mu$ is set to 3 ($\mu=3$).

After steps P7 or P8, a decision is further made at step P10 to determine if phase 1 continues for a predetermined period of time or shorter. When it is decided at step P10 that the phase 1 continues for a period of time longer than the predetermined period of time, on the one hand, the road surface friction coefficient $\mu$ is set at step P11 to a value higher by one stage than the previous road surface friction coefficient $\mu$ determined at step P7 or step P8. On the other hand, when the result of decision at step P10 is in the negative, then the program flow is returned as it is.

Figure 5:
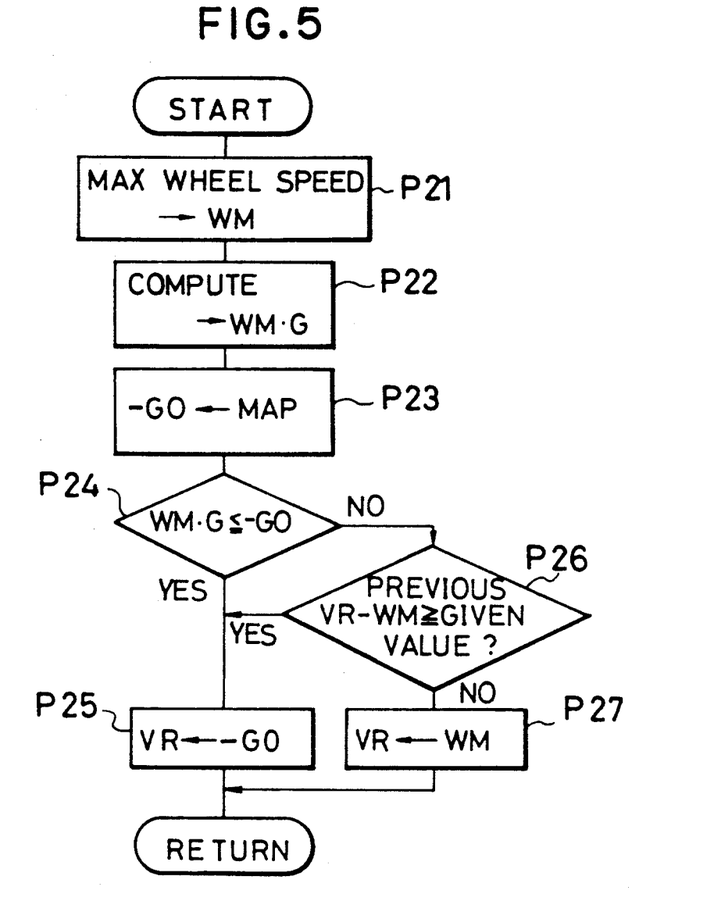
Figure 6:
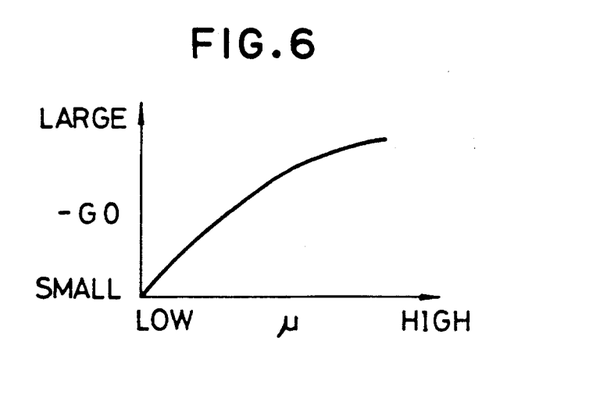
FIG. 6 is a graph showing the relationship between the road surface friction coefficient μ and the reference magnitude of deceleration.

FIGS. 5 & 6

FIGS. 5 and 6 show the practices for assuming the vehicle body speed corresponding to the contents of the control at step P120 in FIG. 3.

First, at step P21 of FIG. 5, the wheel speeds of all the wheels 1FR, 1FL, 1RR and 1RL are detected and the fastest one out of the four wheels is set as a maximum wheel speed WM. Then, at step P22, a varying quantity of the wheel having the maximum wheel speed WM, i.e. a magnitude of acceleration or deceleration, WM-G, of the maximum wheel speed, is computed by differentiating the maximum wheel speed WM. The magnitude of acceleration or deceleration, WM-G, is computed by subtracting the previous wheel speed from the current wheel speed.

Then, at step P23, a reference magnitude of deceleration, $-G0$, is determined in accordance with the road surface friction coefficient $\mu$. It is to be noted herein that the term "reference magnitude of deceleration, $-G0$" is intended to mean a maximum magnitude of deceleration to be predicted as occurring in accordance with the road surface friction coefficient $\mu$ at the moment of braking. FIG. 6 shows the relationship between the reference magnitude of deceleration, $-G0$, and the road surface friction coefficient $\mu$. In FIG. 6, the reference magnitude of deceleration, $-G0$, is set to be smaller as the road surface friction coefficient $\mu$ becomes smaller. In other words, the absolute value G0 of the reference magnitude of deceleration, $-G0$, is set to be larger as the road surface friction coefficient $\mu$ becomes smaller. In this embodiment, the reference magnitude of deceleration, $-G0$, is determined in three stages because the road surface friction coefficient $\mu$ is so arranged as to be determined in three stages.

Then, at step P24, a decision is made to determine if the magnitude of acceleration or deceleration, WM-G, of the maximum wheel speed is smaller than the reference magnitude of deceleration, $-G0$,. When it is decided at step P24 that the magnitude of acceleration or deceleration, WM-G, of the maximum wheel speed is equal to or smaller than the reference magnitude of deceleration, $-G0$, then the program flow goes to step P25 at which the assumed vehicle body speed VR is set on the basis of the reference magnitude of deceleration, $-G0$, followed by the return of the program flow. In other words, as the wheel speed at this moment becomes small rapidly, a value obtainable by subtracting the speed corresponding to the reference magnitude of deceleration, $-G0$, from the previously (latest) assumed vehicle body speed VR is set as the next (current) assumed vehicle body speed VR in order to suppress the assumed vehicle body speed from being reduced rapidly.

When it is decided at step P24 that the magnitude of acceleration or deceleration, WM-G WM G, of the maximum wheel speed is larger than the reference magnitude of deceleration, $-G0$, on the other hand, then a decision is made at step P26 to determine if the value obtainable by subtracting the maximum wheel speed WM from the previous assumed vehicle body speed VR is equal to or larger than a predetermined value. When it is decided that the magnitude of acceleration or deceleration, WM-G, of the maximum wheel speed is larger than the reference magnitude of deceleration $-G0$, then the program flow proceeds to step P25 in order to suppress the assumed vehicle body speed from being decreased rapidly because the wheel speed at this moment is decreasing to a considerably rapid extent.

On the other hand, when the result of decision at step P26 indicates that the magnitude of acceleration or deceleration, WM-G, of the maximum wheel speed is smaller than the reference magnitude of deceleration, $-G0$, then the maximum wheel speed WM is set as the assumed vehicle body speed as it is.

It is noted as a matter of course that the assumed vehicle body speed determined at step P25 or P27 is employed as the previous assumed vehicle body speed at step P26.

Figure 7:
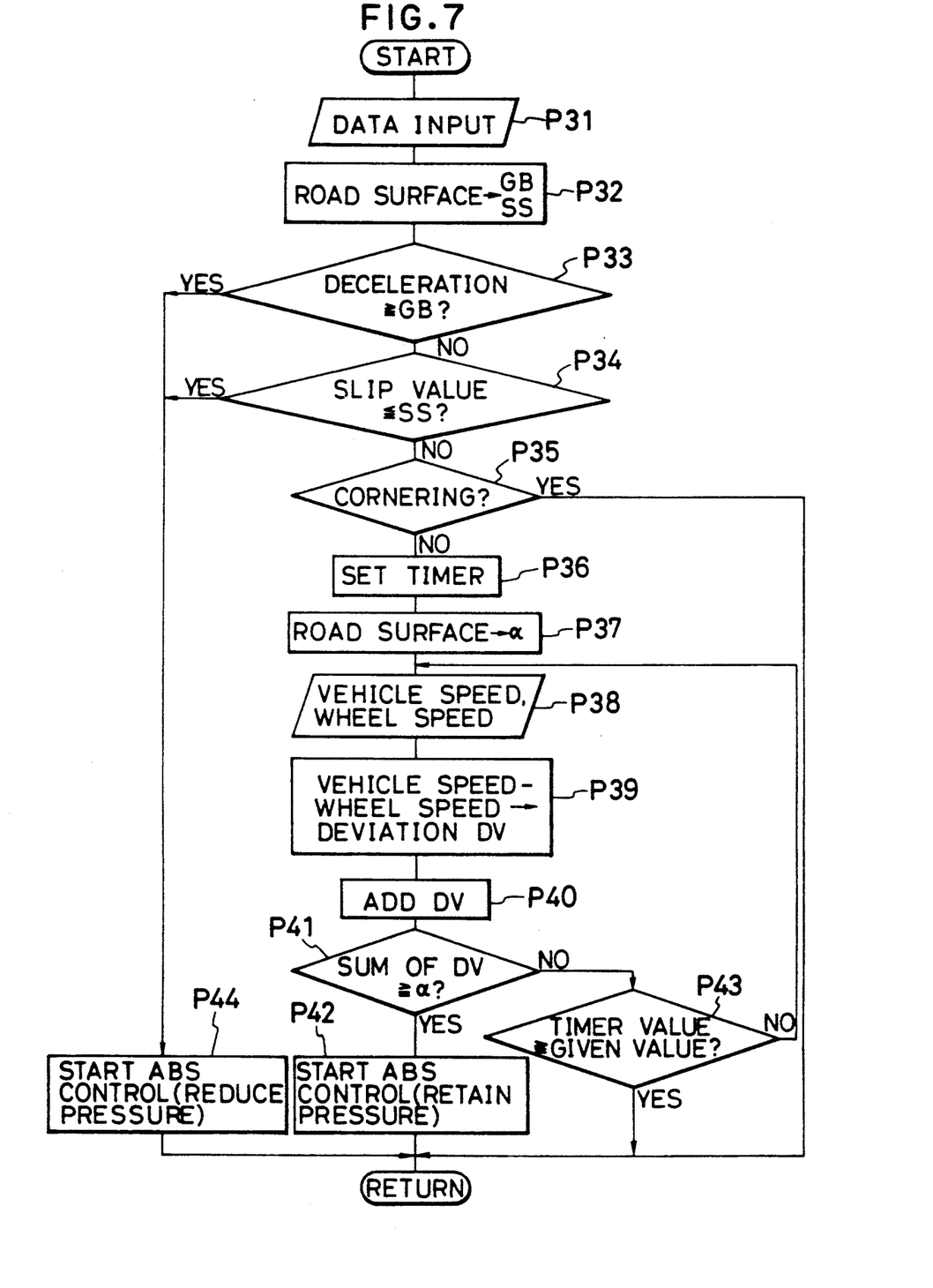
FIG. 7 is a flowchart showing a control example according to the present invention.

FIG. 7

FIG. 7 shows the control contents of step P140 of FIG. 3 for determining if the control of the braking force, i.e. the ABS control, is to be started.

First, at step P31, signals are entered from the sensors, followed by proceeding to step P32 at which a reference magnitude of deceleration, GB, as a threshold value for starting the ABS control and a reference slip value SS are read on the basis of an assumed road surface friction coefficient $\mu$. Then, at step P33, a decision is made to determine if the magnitude of deceleration of the wheel is equal to or larger than the reference magnitude of deceleration GB. In other words, a decision is made to determine if the absolute number of the magnitude of deceleration of the wheel is larger than the absolute value of the reference magnitude of deceleration GB.

When it is decided at step P33 that the magnitude of deceleration is equal to or larger than the reference magnitude of deceleration GB, then the program flow goes to step P44 at which the ABS control is started by the first start means from the state in which the braking liquid pressure is reduced, i.e. the braking force is reduced.

When the result of decision at step P33 is in the negative, then a further decision is made at step P34 to determine if the slip value of the wheel is equal to or smaller than the reference slip value. When it is decided at step P34 that the slip value of the wheel is equal to or smaller than the reference slip value, too, then the program flow goes to step P41 at which the ABS control is started by the first start means.

On the other hand, if the result of decision at step P34 indicates that the slip value of the wheel is larger than the reference slip value, a decision is made to determine if the ABS control should be started by the second start means. In this case, as an error in the deviation obtained by subtracting the wheel speed from the vehicle speed is likely to occur at the time of cornering in this embodiment, the ABS control by the second start means is inhibited at the time of cornering. Hence, first, at step P35, it is decided to determine if the body is being cornered currently by determining a steered angle of the steering wheel.

When it is decided at step P35 that the body of the vehicle is being cornered, then the program flow is returned as it is. It can be noted, however, that the ABS control is started only by the first start means during cornering.

If the decision at step P35 gives the negative result, the timer is set at step P36, followed by proceeding to step P37 at which a predetermined value $\alpha$ is set on the basis of the road surface friction coefficient $\mu$ as a value to be compared for the second start means. The predetermined value is set to become smaller as the road surface friction coefficient $\mu$ becomes smaller. Then, at step P38, the vehicle speed and the wheel speed are read, followed by proceeding to step P39 at which the deviation DV is computed by subtracting the wheel speed from the vehicle speed. Further, at step P40, the deviations DV are added up to give the sum of the deviations.

Then, at step P41, it is decided to determine if the sum DV added up at step P40 is equal to or larger than the predetermined value $\alpha$.

When it is decided at step P41 that the sum DV is smaller than the predetermined value, a decision is made at step P43 to determine if a count value of the timer set at step P36 is equal to or larger than a predetermined value. If the decision at step P43 gives the negative result, then the program flow goes back to step P38 at which the deviations DV are added up.

When it is decided at step P41 that the sum DV is equal to or larger than the predetermined value $\alpha$, then the program flow goes to step P42 at which the ABS control is started by the second start means from the state in which the braking liquid pressure is sustained, i.e. in which the braking force is sustained.

On the other hand, when it is decided at step 43 that the count value of the timer is equal to or larger than the predetermined value, no ABS control is started and the program flow is returned as it is.

As described hereinabove, the embodiment in FIG. 7 is arranged in such a manner that the sum DV is compared with the predetermined value $\alpha$ at step P41 so as to set the direction in which the ABS control by the second start means is likely to be started with relative ease, at every cycle starting from step P38 through steps P41 and P43 back to step P38, i.e. whenever the sum added up at step P40 is renewed. In other words, if the predetermined value of the timer indicates the count, "n times", indicative of the sum DV that are added up n times at step P43, then the decision at step P41 is made n times.

At step P40, the current sum is added to the previous sum that is stored in the ROM of the control unit U.

Figure 8:
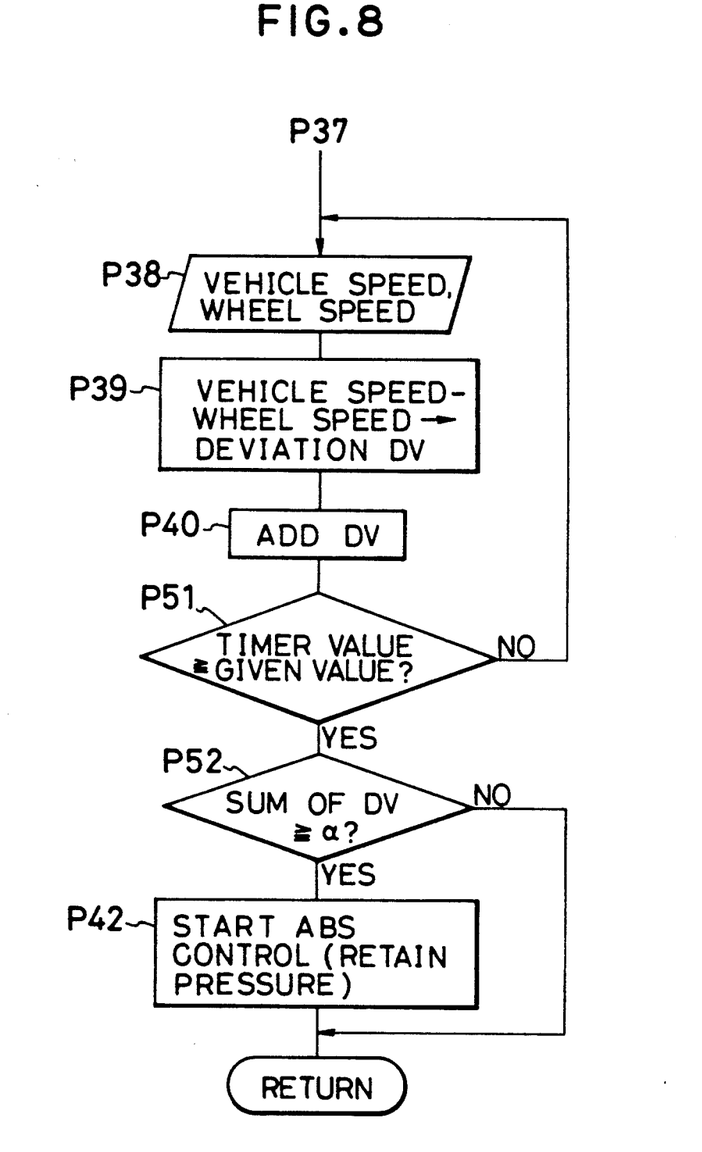
FIG. 8 is flowchart showing another example according to the present invention.

FIG. 8

FIG. 8 shows another example of the contents of the control according to the present invention and differs from FIG. 7 in the flowchart starting from step P40 in FIG. 7.

First, at step P40, the deviations DV were added up, then the program flow goes to step P51 at which it is decided to determine if the value of the timer is equal to or larger than a predetermined value. If the decision at step P51 gives the negative result, then the program flow goes back to step P38 at which the deviations DV are added up.

On the other hand, when it is decided at step P51 that the value of the timer is smaller than the predetermined value, then the program flow goes to step P52 at which it is further decided to determine if the sum DV added up so far is equal to or smaller than the predetermined value $\alpha$.

When the result of decision at step P52 indicates that the sum DV added up so far is larger than the predetermined value $\alpha$, then the program flow goes back to step P42 at which the ABS control is started.

On the other hand, when the decision at step P52 gives the negative result, the program flow is returned without starting the ABS control.

As described hereinabove, the embodiment as shown in FIG. 8 is so arranged as to make no decision at step P52 unless the deviations DV are added up for a predetermined period of times, i.e. at predetermined times. This can avoid any influence of noises and cause the ABS control to be started only at the time when the ABS control is actually required to be started.

The embodiments as described hereinabove indicate the instance where both of the magnitude of deceleration of the wheel and the slip value are employed for determining the start of the ABS control by the first start means. However, the slip control system according to the present invention should be interpreted as being not restricted to the instance as described hereinabove and encompasses the instance where either one of the magnitude of deceleration of the wheel or the slip value is employed therefor.

Further, the embodiments of the present invention as described hereinabove indicate the instance where the control of the braking force by the first start means is set to be started prior to the start of the control of the braking force by the second start means by determining if the conditions for starting the second start means are met only when no conditions for starting the first start means are satisfied. This manner is preferred in term of preventing the wheels from being locked rapidly. However, the slip control system of the present invention can be arranged in such a manner that the conditions for starting the first start means are decided when the conditions for starting the second start means are not satisfied. This manner is preferred in terms of the fact that the shortening of the braking distance is placed more priority than the locking of the wheels.

It is to be understood that the present invention is not construed as being restricted to those described hereinabove, which are described merely for illustrative purposed, and as encompassing all changes, variations, and modifications within the spirit and scope of the present invention.

What is claimed is:

1. A slip control system for an automotive vehicle capable of controlling braking force so as not to cause a wheel to be locked at the time of braking and so as to sustain the braking force, elevate the braking force, or reduce the braking force, comprising:

a first start means for starting the control of the braking force from a state in which the braking force is reduced, when a slip value indicative of a magnitude of deceleration of the wheel or the tendency of locking the wheel against a road surface exceeds a predetermined threshold value; and a second start means for starting the control of the braking force from a state in which the braking force is sustained, when a deviation obtained by subtracting a wheel speed from a vehicle speed reaches a predetermined value or larger.

2. A slip control system as claimed in claim 1, further comprising:

cornering detecting means for detecting cornering of the automotive vehicle; and inhibiting means for inhibiting the start of the control of the braking force by said second start means when the cornering of the automotive vehicle is detected by said cornering detecting means.

3. A slip control system as claimed in claim 1, wherein the control of the braking force by said first start means is set to be started prior to the start of the control of the braking force by said second start means.

4. A slip control system as claimed in claim 1, further comprising:

addition means for adding up a deviation between the vehicle speed and the wheel speed;

wherein a sum added up by the addition means is employed as a deviation to be compared with the predetermined value.

5. A slip control system as claimed in claim 4, wherein a decision is made to determine if the control of the braking force by said second start means is started by comparing the sum with the predetermined value whenever the sum is renewed by said addition means.

6. A slip control system as claimed in claim 5, wherein the sum is renewed by said addition means only for a predetermined period of time.

7. A slip control system as claimed in claim 4, wherein a decision is made to determine if the control of the braking force by said second start means is started by comparing the sum with the predetermined value, said sum being obtained by adding up the sums for a predetermined period of time by said addition means.

8. A slip control system as claimed in claim 1, wherein at least one of a threshold value for the magnitude of deceleration of the wheel, a threshold value for the slip value, and a threshold value for said deviation is altered in accordance with a road surface friction coefficient $\mu$.

9. A slip control system as claimed in claim 8, wherein said threshold value for the magnitude of deceleration of the wheel is altered so as to become smaller as the road surface friction coefficient $\mu$ becomes smaller, so that said threshold value thereof is altered to a value in a direction in which the control of the braking force is likely to be started.

10. A slip control system as claimed in claim 8, wherein said threshold value for the slip value is altered so as to become smaller as the road surface friction coefficient becomes smaller, so that said threshold value thereof is altered to a value in a direction in which the control of the braking force is likely to be started.

11. A slip control system as claimed in claim 8, wherein said threshold value for the deviation is altered so as to become smaller as the road surface friction coefficient $\mu$ becomes smaller, so that said threshold value thereof is altered to a value in a direction in which the control of the braking force is likely to be started.

12. A slip control system as claimed in claim 1, wherein a shift to sustain the braking force, elevate the braking force, and reduce the braking force is made at the time of the control of the braking force by using said magnitude of deceleration of the wheel and said slip value as a threshold value for said shift.

13. A slip control system as claimed in claim 12, wherein said threshold value is altered in accordance with a road surface friction coefficient $\mu$.

14. A slip control system as claimed in claim 1, further comprising:

detection means for detecting a speed of rotation of the wheel, wherein said magnitude of deceleration of the wheel is computed by differentiating said speed of rotation of the wheel detected by said detection means.

15. A slip control system as claimed in claim 1, wherein said slip value is determined on the basis of the vehicle speed and a speed of rotation of the wheel.

16. A method of controlling a slip control system for an automotive vehicle capable of controlling braking force so as not to cause a wheel to be locked at the time of braking and so as to sustain the braking force, elevate the braking force, reduce the braking force, comprising:

a first start step for starting the control of the braking force from a state in which the braking force is reduced, when a slip value indicative of the magnitude of deceleration of the wheel or the tendency of locking the wheel against the road surface exceeds a predetermined threshold value; and a second start step for starting the control of braking force from a state in which the braking force is sustained, when a deviation obtained by subtracting a wheel speed from the vehicle speed reaches a predetermined value or larger.

17. A method for controlling a slip control system as claimed in claim 16, further comprising the steps of:

detecting cornering of the automotive vehicle; and inhibiting the start of control of the braking force when the cornering of the automotive vehicle is detected.

18. A method of controlling a slip control system as claimed in claim 16, wherein said first start step is set to be started prior to said second start step.

19. The method of controlling a slip control system as defined in claim 16, further comprising the step of:

adding up a deviation between the vehicle speed and the wheel speed;

wherein a sum added up by the step of adding is employed as a deviation to be compared with the predetermined value.

20. A method of controlling a slip control system as claimed in claim 19, further comprising the step of determining if said second start step is started by comparing the sum with a predetermined value whenever the sum is renewed by said step of adding.

* * * * *